April 18, 1950 L. B. NEIGHBOUR ET AL 2,504,442
VEHICLE BODY CONSTRUCTION FOR MANURE SPREADERS
Original Filed Nov. 4, 1940 2 Sheets-Sheet 1
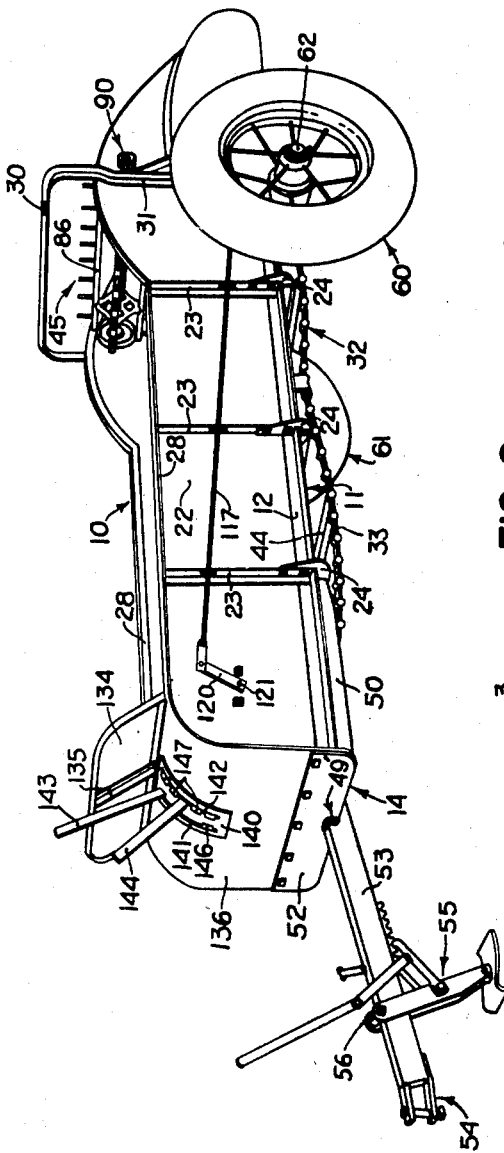

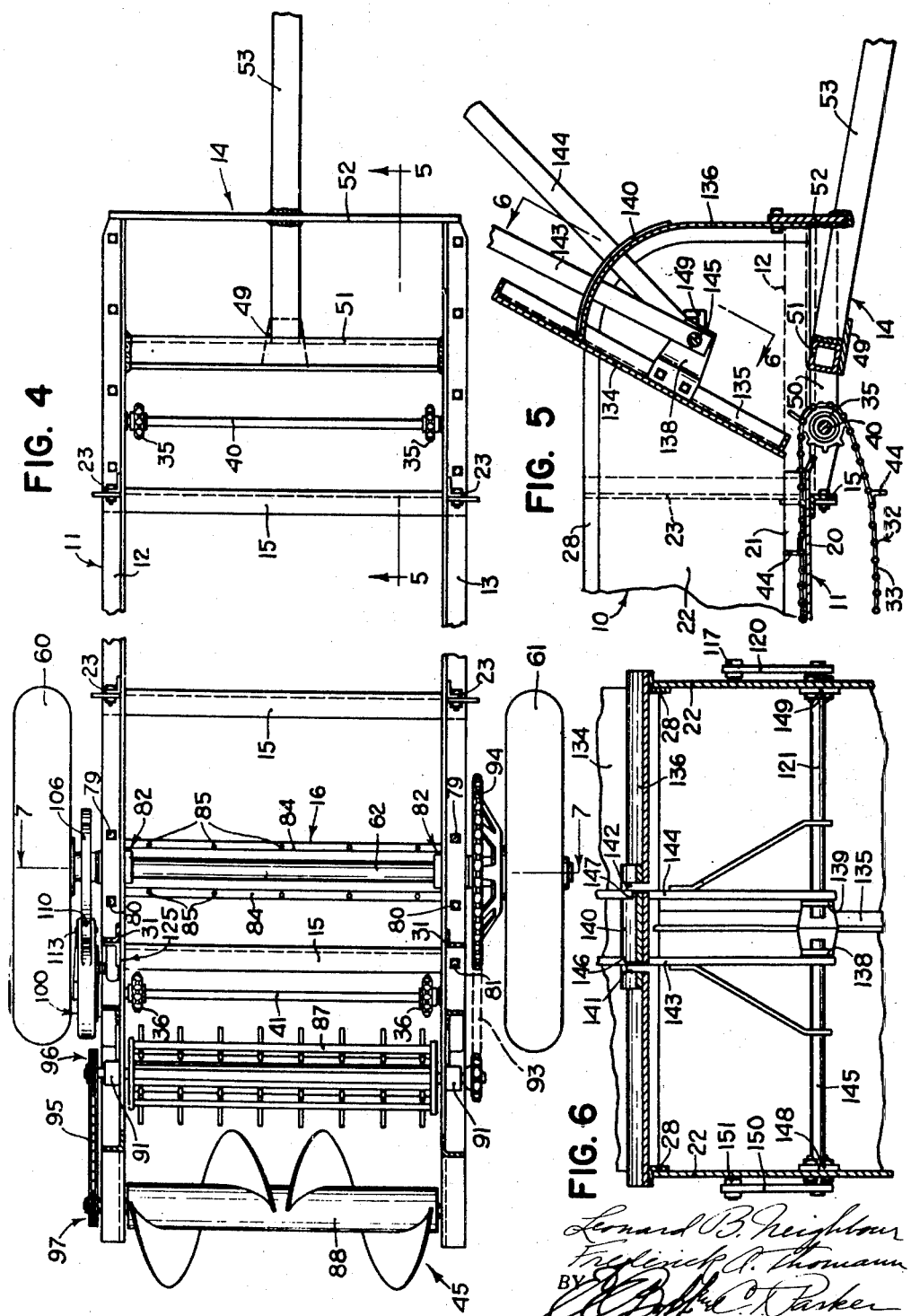

Patented Apr. 18, 1950

2,504,442

UNITED STATES PATENT OFFICE 2,504,442

VEHICLE BODY CONSTRUCTION FOR MANURE SPREADERS

Leonard B. Neighbour, Moline, and Frederick A. Thomann, East Moline, Ill., assignors to Deere & Company, Moline, Ill., a corporation of Illinois Application June 15, 1942, Serial No. 447,098, which is a division of application Serial No. 364,196, November 4, 1940. Divided and this application May 3, 1945, Serial No. 591,784

10 Claims. (Cl. 275—6)

1

The present invention relates to two-wheeled tractor-drawn implements, and more particularly to a tractor-drawn manure spreader of the type comprising a body supported at the rear end on a pair of laterally spaced wheels and at the front end on the tractor drawbar. This application is a division of our co-pending application, Serial No. 447,098, filed June 15, 1942, and issued March 26, 1946 as Patent No. 2,397,429, which, in turn, is a division of our application, Serial No. 364,196, filed November 4, 1940 and issued November 24, 1942 as Patent No. 2,302,879.

The principal object of this invention is to provide an improved two-wheeled manure spreader that is exceedingly stiff and rigid against lateral twisting or weaving when the spreader is unevenly loaded or when it is driven over rough ground, but which is light in weight and economical to manufacture.

These and other objects and advantages of the present invention will become apparent to those skilled in the art after consideration of the following detailed description of the preferred embodiment thereof, reference being had to the accompanying drawings, in which Figure 1 is a perspective view of a two-wheeled manure spreader constructed according to the principles of our invention;

Figure 2 is an enlarged detail view of one of the braces holding the sides of the manure box in place;

Figure 3 is a sectional view, taken along the line 3—3 in Figure 2;

Figure 4 is a top plan view of the under frame structure supporting the manure box and spreading mechanism with the floor plate and apron removed;

Figure 5 is a vertical section, taken through the manure box and frame substantially as indicated by the line 5—5 in Figure 4 but showing the floor plate and apron; and Figure 6 is a sectional view taken along the line 6—6 in Figure 5.

Referring now to the drawings, the manure spreader illustrated consists of a generally fore and aft extending body 10 supported on a frame structure 11 comprising a pair of laterally spaced, longitudinally extending angle iron members 12 and 13 which are joined together at their front ends by a hitch frame 14. Transversely disposed cross angle members 15 connect the frame members 12, 13 at longitudinally spaced intervals, and near their rear ends the frame members are connected by a transverse torque member 16. A sheet metal bed, or flooring 20 rests upon and is fixed

2 to the cross members 15 and has upwardly turned flanges 21 at the sides thereof which are fixed to the longitudinal frame members 12, 13.

The side walls of the spreader body are indicated by the reference numeral 22 and are preferably made of sheet metal which is fixed to vertical angle members 23. The upper edge and curved front end of the side walls are reenforced by light angles 28, one flange of which is fixed to the inner sides of the side walls and the other flange of which extends outwardly over the edge of the side walls. The vertical members 23 are fixed at their lower ends to the longitudinal frame members 12, 13, adjacent the ends of the cross members 15, and are connected with their respective cross members by braces 24. The braces 24 consist of plates which are adapted to be bolted at 25 to the transverse vertical flanges of the vertical angle members 23, and at 26 to the transverse vertical flanges of the cross members 15. The edges of the plates are slotted at 27 to receive the horizontal flanges of the longitudinal frame members 12, 13 and 15. This construction provides a brace of great strength for preventing the sides of the body from spreading, and at the same time eliminates the need for projecting the ends of the transverse members laterally outwardly beyond the side walls to secure a connection for the brace. The arrangement described above forms the subject matter of our U. S. Patent 2,443,265, issued on our co-pending application, Serial No. 447,098, filed June 15, 1942.

The sides of the body are tied together at the top by an angle iron member 30 formed in the shape of an inverted U, the extremities 31 thereof projecting down along the exterior of the side walls and being secured thereto. The arch portion of the member 30 extends far enough above the side walls of the body to permit a heaped-up load of material carried by the body to pass thereunder.

The material carried in the body is caused to travel gradually rearwardly therein, when the machine is in operation, by an endless belt conveyor or apron 32 of the type comprising a pair of laterally spaced endless chains 33 which are trained over sprocket wheels 35 and 36 mounted on front and rear shafts 40 and 41, respectively. The shafts 40, 41 are journaled in suitable bearings (not shown) fixed to the under sides of the longitudinal frame members 12, 13. Transverse slats 44 of angle iron are fixed to the chains 33 at intervals, and scrape along the flooring 20 to carry the material rearwardly to rotary beating and distributing mechanism, indicated generally by the reference numeral 45, disposed at the rear of the spreader body. The conveyor is operated by mechanism that will be described in detail presently.

The front end of the body 10 is supported on the hitch frame 14 and is rigidly braced thereby against twisting about the longitudinal axis of the body. The hitch frame 14 consists of a pair of laterally spaced fore and aft extending angle members 50 which are fixedly secured to the under sides of the longitudinal frame members 12, 13 at the front ends thereof. The members 50 are connected together by a pair of fore and aft spaced, transversely extending beams or bracing members 51 and 52 which are welded to the midpoints and front ends, respectively, of the members 50. Preferably, the beam 51 is a box section beam tilted forwardly slightly, as best shown in Figure 5, while beam 52 consists of a vertically disposed flat plate or bar. A box section draft tongue 53 is welded to the midpoint of beam 51 and is additionally secured thereto by a gusset plate 49. The tongue extends forwardly and downwardly from beam 51 through a notch 49' in the bottom edge of beam 52, to which it is welded. The front end of the draft tongue 53 is provided with any suitable coupling means 54 adapted for connection with the drawbar of a tractor. When the draft tongue is hitched to a tractor drawbar, a considerable portion of the weight of the spreader body and the load carried thereby is supported on the drawbar. When the tongue 53 is disconnected from the tractor, it is supported on a swinging jack stand 55 which is pivoted to the tongue at 56. The hitch frame construction described above is exceedingly rigid and adds materially to the stiffness of the body for resisting twisting when one corner of the spreader is more heavily loaded than the others.

The rear end of the spreader is supported on a pair of laterally spaced traction drive wheels 60 and 61 which also furnish the power for driving the conveying and distributing mechanism. The wheels, 60, 61 are mounted upon a rear axle 62 which extends transversely across the rear portion of the body.

The load-carrying body is supported from the rear axle by brackets which are secured to the under sides of the longitudinal frame members 12, 13, respectively, by bolts 79, 80 and 81. Bearing housings 82 are carried in the brackets and the axle 62 is rotatably supported in the bearing housings.

The transversely disposed torque member 16 embraces the rear axle 62 and is made of heavy gauge sheet metal or boiler plate, preferably bent into the form of a U-shaped channel member having outwardly turned flanges 84 which are riveted at 85 to the under side of the flooring 20. The laterally outer ends of the torque member 16 are welded to the inner surfaces of the bearing support flanges thereby forming, in effect, a closed, hollow beam wherein the flooring 20 constitutes one side of the beam. This beam construction has great torsional strength and adds to the stiffness and rigidity of the spreader body. Further details of this part of the machine are given in our co-pending application mentioned above.

The beating and distributing mechanism 45 consists of an upper beater 86, a lower beater 87, and a rotary widespread 88 to the rear thereof, the function of the beaters being to break up the manure as it is fed thereto by the conveyor 32, and to distribute the manure to the widespread which scatters it over the ground. The beaters 86 and 87 are mounted on suitable shafts which are journaled in bearings 90 and 91 fixed to the sides 22 of the body. The beaters are driven through the medium of a chain 93 having driving engagement with a large sprocket 94 fixed to the wheel 61, and the chain 93 is trained over sprockets fixed to the ends of the beater shafts.

The rotary widespread 88 is driven from the lower beater 87 by a chain 95 which is trained around sprockets 96 and 97 fixed to the left hand ends of the beater and drum shafts, respectively. Suitable means, not shown, is provided for interrupting the drive from the sprocket 94 to the beaters, thereby stopping the operation of the beating and distributing mechanism.

The conveyor 32 is propelled through the sprocket wheels 36 on the rear shaft 41, the latter being driven slowly by ratchet mechanism contained within a housing 100, which is journaled on the extended end of the shaft 41 outside of the body. The ratchet mechanism is shown and described in the above mentioned Patent No. 2,302,879, to which reference may be made for such details. It is sufficient for present purposes to state that the ratchet mechanism advances the shaft 41 when the housing 100 is rocked about the axis of the shaft. This is accomplished by means of a camming member 106, which rotates with the wheel 60 as the spreader travels forwardly, engaging a roller 110 journaled on a pin 113, carried on the housing 100. The rate of speed of the conveyor is controlled by controlling the extent of rocking movement of the housing 100, as described in said patent. This is accomplished by means of a hand operated lever 144, mounted on a transverse shaft 121, which is connected with the housing 100 through a lever arm 120 and link rod 117.

Fixed to the side walls 22 of the load carrying body 10 adjacent the front end thereof is a downwardly and rearwardly inclined dash 134 forming a front end wall, the lower end of which terminates substantially at the front end of the flooring 20 (Figure 5) but spaced above the latter to provide a transverse slot extending substantially between said side walls, through which the conveyor chain 33 and slats 44 can pass. The dash extends above the top of the side walls to allow the manure to be heaped up and thereby increase the quantity of manure carried in each load. A reenforcing angle member 135 is fixed to the under side of the dash and extends down the center thereof. A generally transversely disposed hood 136 of heavy gauge sheet metal or boiler plate is fixed to the front ends of the side walls 22 upon the laterally extending flanges of the reenforcing angles 28 and is bolted to the top edge of the hitch frame cross bar 52. The hood 136 forms an arcuate securing means which extends upwardly from the bar 52, curving rearwardly near its upper end to correspond to the curvature of the sides, and is joined to the underside of the inclined dash 134. A curved reenforcing plate 140 is fixed to the longitudinal center portion of the curved hood, and both the hood and plate have a pair of laterally spaced vertical slots 141 and 142 formed therein to pass levers 143 and 144, respectively, which are mounted on transversely extending shafts 145 and 121. The shafts 145 and 121 are disposed within the space or forward compartment enclosed by the inclined dash 134, hitch frame 14, and curved hood 136, and are journaled in brackets 138 and 139 fixed to the member 135, and in bearing members 148 and 149 fixed to the side walls 22 of the body. One side of the slot 141 is notched at 146 to receive and lock the lever 143 in adjusted position, while slot 142 is notched at 147 to receive and lock the lever 144 in adjusted position. Preferably, the curve of the hood 136 and plate 140 is an arc about the axis of the shafts 121, 145, so that the notches of the slots 141 and 142 engage their respective levers 143, 144 at the same point in any position of adjustment. As stated previously, lever 144 controls the rate of feed of the mechanism actuating the conveyor apron 32. Shaft 145, which is operated by the lever 143, likewise has an arm 150 mounted on the outer end thereof which is connected with an operating rod 151 having operating connection at its rear end with the mechanism (not shown) for interrupting the transmission of power from the axle 62 to the beaters 86, 87 and widespread 88.

A manure spreader constructed in the manner described above is light in weight and economical to manufacture, and at the same time has great strength and rigidity for resisting torsional forces tending to twist the body about its longitudinal axis. This rigidity results from the combination of the several structural elements, such as the hitch frame 14, curved hood 136, and torque member 16, which go to make up the complete machine.

What we claim as our invention is:

1. In a manure spreader of the type comprising a box-like body having a pair of side walls and spreading means at the rear end of the body, a front end wall spaced rearwardly from the forward ends of said side walls and attached at opposite ends thereof to the latter, control mechanism for the spreading means disposed between said side walls ahead of said front end wall, draft means connected between the forward ends of said side walls for bracing the latter and for connecting the front end of said spreader to a tractor, and a hood extending upwardly and rearwardly from and secured to said draft means ahead of said end wall and between said side walls and fixed at its upper end to said end wall for bracing said walls and for enclosing said control mechanism.

2. In a manure spreader having a frame and a pair of side walls and spreading mechanism at its rear end, a front end wall spaced rearwardly from the forward ends of said side walls and attached at opposite ends thereof to the latter, a pair of coaxial rockshafts disposed transversely ahead of said end wall, the outer ends of said shafts extending through said side walls and journaled therein, bearing means mounted in said end wall substantially at the center of the latter for rotatably supporting the adjacent inner ends of said shafts, control arms fixed to the outer ends of said shafts outside said side walls, connecting means attached to said arms and extending rearwardly along the outer sides of said side walls and adapted for connection to the spreading mechanism at the rear of said spreader, a pair of control levers fixed to the adjacent inner ends of said shafts, an apron movable rearwardly between said side walls and beneath said end wall, and an apron supporting member extending transversely between said side walls and supported thereon ahead of said end wall, a transverse bracing member interconnecting the forward ends of said side walls spaced forwardly of said end wall, and an arcuate hood extending upwardly and rearwardly from said transverse bracing member and fixed at its upper end to said end wall for bracing said walls and for enclosing said rockshafts and said apron supporting member, said hood having slots through which said levers extend, a side edge of each slot being adapted to engage the associated lever to retain the latter in adjusted position.

3. A vehicle body structure comprising a pair of laterally spaced, longitudinally extending beams, a flooring rigidly supported on said beams, a pair of walls disposed along opposite sides of said flooring and rigidly supported on said beams, a transversely disposed stiffening hood member rigidly mounted on said beams adjacent the ends thereof and extending upwardly and inclined longitudinally, the side edges of said hood member being rigidly fixed to said side walls, respectively, and an end wall disposed transversely inwardly of said hood and rigidly fixed along opposite side edges to said side walls and rigidly fixed along the upper edge of said stiffening hood, said end wall being entirely supported on said side walls and hood and having an unsupported lower edge spaced above said flooring to provide a free unobstructed opening therebetween adapted to receive a movable conveyor.

4. A vehicle body structure comprising a pair of laterally spaced, longitudinally extending beams, a flooring rigidly supported on said beams and terminating short of the ends of said beams, a pair of walls disposed along opposite sides of said flooring and extending beyond the latter to the ends of said beams and rigidly supported on the latter, a transversely disposed stiffening hood member rigidly mounted on said beams adjacent the ends thereof and extending upwardly and inclined longitudinally in the direction toward the opposite ends of said beams, the side edges of said hood member being rigidly fixed to said side walls, respectively, and an end wall disposed transversely inwardly of said hood and rigidly fixed along opposite side edges to said side walls and rigidly fixed along the upper edge of said hood, said end wall being entirely supported on said side walls and hood and having an unsupported lower edge spaced above said flooring, a transverse draft beam spaced between the end of said flooring and the ends of said beams and rigidly connected between said beams, a second transverse draft beam interconnecting the ends of said longitudinal beams and rigidly connected along the lower edge of said hood, and a draft tongue connected rigidly to said draft beams and extending longitudinally therefrom.

5. A vehicle body structure comprising a pair of laterally spaced, fore-and-aft extending interconnected beams, side walls supported on said beams, a front end wall supported on said side walls and beams rearward of the forward ends of the latter, a stiffening hood member attached to said beams adjacent their forward ends and extending upwardly and rearwardly and attached to said end wall, said hood having a vertical slot therein, a lever pivotally mounted beneath the hood member for vertical swinging movement in a longitudinal plane and extending out through said slot, and means on said hood alongside said slot for holding said lever in adjusted position.

6. In a material spreader of the type having a longitudinal, box-like body providing a material-carrying compartment including opposite side walls and having spreading means at its rear end and draft means at its forward end adapting the spreader for connection to a source of draft power: a front end construction for the body, comprising a transverse front end wall having at least a portion thereof disposed rearwardly of the front ends of the side walls so that the front end wall and the forward portions of the side walls provide generally a forward compartment ahead of and separated by the front end wall from the material-carrying compartment of the body, control mechanism for the spreading means disposed in said forward compartment, and transverse bracing means interconnecting the forward portions of the side walls ahead of the front end wall.

7. In a material spreader having a longitudinal body including opposite side walls and having spreading means at its rear end: a front end construction for the body, comprising a transverse front end wall having at least a portion thereof spaced rearwardly of front end portions of the side walls and secured at opposite ends to the latter to form part of the body; a pair of coaxial rockshafts disposed transversely ahead of said front end wall portion and having opposite outer ends extending respectively through the front end portions of the side walls; inner bearing means mounted on the body substantially centrally of and projecting ahead of the end wall portion for carrying the adjacent inner ends of the rockshafts; a pair of outer bearings mounted on the body respectively adjacent and inwardly of the side wall portions for respectively carrying outer end portions of the rockshafts; control arms fixed respectively to said outer end portions of the rockshafts respectively outside said side wall portions, and adapted for connection to the spreading means; and a pair of adjustable control levers disposed side by side adjacent and fixed respectively to inner end portions of the rockshafts.

8. The invention defined in claim 7, further characterized in that: a transverse bracing member is provided for cross-connecting the forward portions of the side walls ahead of the front end wall portion, and securing means is connected to said bracing member and extends rearwardly and is connected to the front end wall, said means including portions respectively engageable by the control levers for holding the latter in adjusted positions.

9. The invention defined in claim 7, further characterized in that: an apron-supporting member extends transversely from one side wall forward portion toward the other ahead of the front end wall portion at a level below the level of the rockshafts; and means is provided for journaling said members on the body adjacent at least said one side wall.

10. The invention defined in claim 7, further characterized in that: draft means is connected to the forward end of the body, including a transverse brace cross-connecting the forward portions of the side walls ahead of the end wall.

LEONARD B. NEIGHBOUR.
FREDERICK A. THOMANN.

REFERENCES CITED

The following references are of record in the file of this patent:

UNITED STATES PATENTS

| Number | Name | Date |
|---|---|---|
| 781,956 | Kinney | Feb. 7, 1905 |
| 1,189,658 | Brown | July 4, 1916 |
| 1,797,530 | Mayer | Mar. 24, 1931 |
| 1,963,478 | Swanson et al. | June 19, 1934 |
| 2,191,868 | Snow | Feb. 27, 1940 |
| 2,221,266 | Roach | Nov. 12, 1940 |
| 2,256,815 | Raney et al. | Sept. 23, 1941 |
| 2,274,481 | Johnston | Feb. 24, 1942 |
| 2,342,837 | Brown | Feb. 29, 1944 |
| 2,397,429 | Neighbour et al. | Mar. 26, 1946 |